United States Patent

Wang

Patent Number: 5,966,463
Date of Patent: *Oct. 12, 1999

[54] DATAFORM READERS USING INTERACTIVE STORAGE AND ANALYSIS OF IMAGE DATA

[75] Inventor: Ynjiun P. Wang, Fort Myers, Fla.

[73] Assignee: Meta Holding Corporation, Fort Myers, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/556,311

[22] Filed: Nov. 13, 1995

[51] Int. Cl.⁶ .................................................. G06K 9/46
[52] U.S. Cl. ........................ 382/202; 382/282; 382/305; 235/462
[58] Field of Search ..................................... 235/462, 463, 235/464; 382/177, 183, 282, 283, 291, 292, 317, 323, 312, 305, 202; 345/192, 521; 358/403, 404

[56] References Cited

U.S. PATENT DOCUMENTS

| | | | |
|---|---|---|---|
| 3,164,806 | 1/1965 | Rabinow | 382/177 |
| 3,553,437 | 1/1971 | Boothroyd | 235/462 |
| 3,778,597 | 12/1973 | Vanderpool et al. | 235/463 |
| 4,403,339 | 9/1983 | Wevelsiep et al. | 382/317 |
| 4,411,016 | 10/1983 | Wakeland | 235/462 |
| 4,477,797 | 10/1984 | Nakagiri | 382/312 |
| 4,641,357 | 2/1987 | Satoh | 382/317 |
| 5,134,272 | 7/1992 | Tsuchiya et al. | 235/462 |
| 5,276,315 | 1/1994 | Surka | 235/462 |
| 5,304,787 | 4/1994 | Wang | 235/462 |
| 5,323,327 | 6/1994 | Carmichael et al. | 364/478 |
| 5,396,497 | 3/1995 | Veltman | 370/100.1 |
| 5,550,365 | 8/1996 | Klancnik et al. | 235/462 |

Primary Examiner—Amelia Au
Assistant Examiner—Timothy M. Johnson
Attorney, Agent, or Firm—Renner, Otto, Boisselle & Sklar, PLL

[57] ABSTRACT

Line-by-line dataform readers and methods are enabled to operate with reduced buffer memory capacity. Storage and retention of image data are controlled on an interactive basis by concurrent analysis while lines of image data are coupled from a linear scanner. In a first embodiment lines of image data are analyzed for recognition of a feature unique to a type of dataform. Upon successful feature recognition a series of earlier and later lines of image data adequate to include a complete dataform image are retained in memory for decoding purposes. Prior to successful feature recognition, as lines of image data exceeding a limited memory storage capacity are received the earliest stored lines are discarded on a first-in-first-out basis. In a second embodiment, a buffer memory has a storage capacity adequate to store only a partial dataform image. Upon successful dataform feature recognition the type and size of the dataform are determined and decoding of the earliest lines including dataform image data is initiated, before the full dataform image is stored. As decoding progresses, the earliest lines of dataform image data are discarded as later lines of dataform image data are still being coupled from the scanner. Cost and power usage are lowered by reduction of required memory capacity.

18 Claims, 8 Drawing Sheets

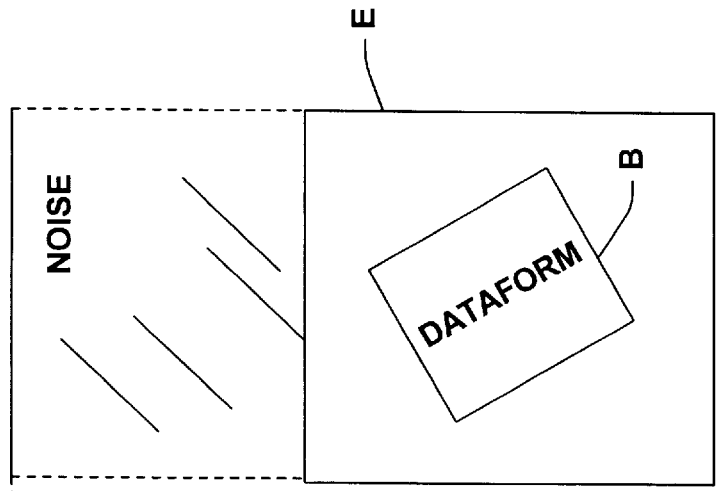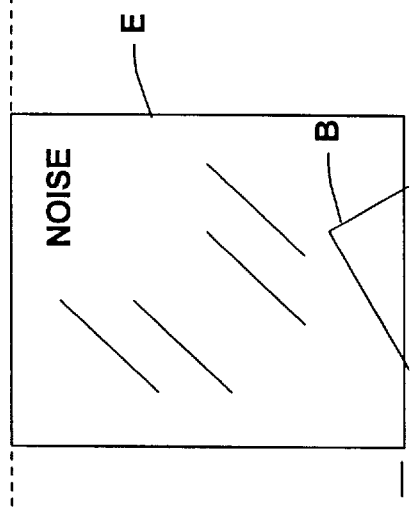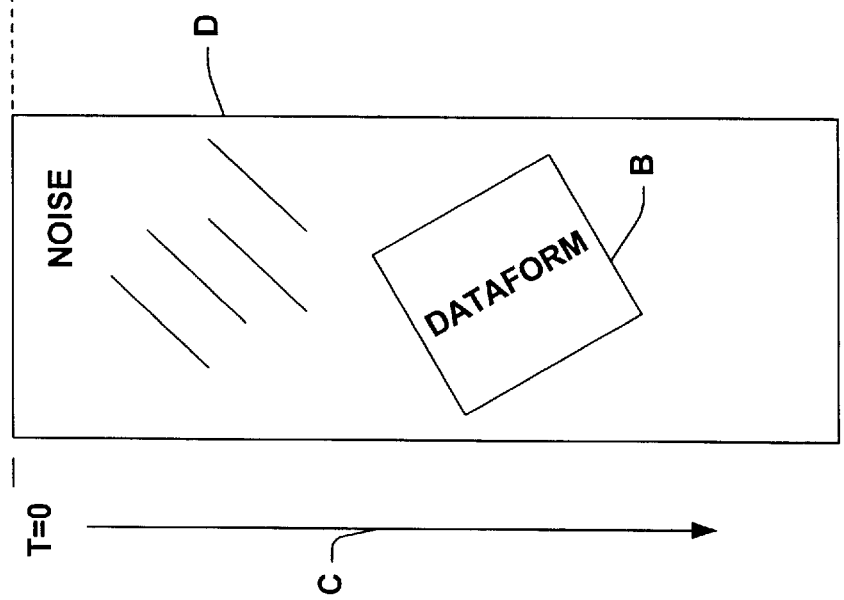

T,T,T,X,X,T,T,T
MAXICODE BULL'S
EYE

PERMISSIBLE ZONE
T,T,T,T
CODE 1
CENTER GUARD
PATTERN

DATAFORM READERS USING INTERACTIVE STORAGE AND ANALYSIS OF IMAGE DATA

This invention relates to dataform readers and, more particularly, to readers and methods using interactive storage and analysis during line-by-line dataform reading in order to control image data storage and retention, reduce required memory capacity, or both.

BACKGROUND OF THE INVENTION

Arrangements for use of dataforms, such as two-dimensional (2-D) bar codes, MaxiCodes, matrix codes, etc., are well known and increasing. A dataform, defined as a machine-readable image may be printed or otherwise placed on a surface for subsequent reading and decoding to recover data originally encoded into the dataform. Readers wherein a reflected image of a dataform is focused on a two-dimensional array of photo sensors for storage of a dataform image provide certain advantages. Readers of a second general type wherein a dataform image is stored into memory on a line-by-line or similar piece-by-piece basis can provide advantages in cost and simplicity. Such a reader may, for example, comprise a line scanner (e.g., including a linear array of CCD sensors) which is moved relative to the dataform to provide image data on a line-by-line basis. The present invention provides improvements particularly useful in this second type of dataform reader.

A first prior form of a line-by-line dataform reader is arranged to read 2-D bar codes, such as PDF417 or Supercode stacked codes, on a full codeword basis. After each line scan, an attempt is made to decode codewords for that scan line. If a codeword is found, the reader stores the decoded codeword for later output after the entire bar code has been decoded. The image data is not retained.

A second form of line-by-line dataform reader, to which the invention is applicable, is arranged to use image data from successive individual scan lines to assemble a full image of the dataform in memory. Decoding is then based on use of such stored image. In this type of reader one dimension of image storage is based on the number of pixels represented by a 1-D scanner device, such as a linear array of CCD sensors. Generally, a line of CCD sensors forming such a 1-D scanner device must be wide enough to cover the width of a dataform of interest along a first direction with adequate resolution to enable decoding. The scanner device then, by relative motion, is moved across the dataform along a second direction normal, or essentially normal, to the first direction.

This is represented conceptually in FIG. 1. The operator activates 1-D scanner device A at the position shown ahead of MaxiCode B and then moves device A in direction C, which represents a direction normal to the length of scanner device A. As noted, one dimension of image storage, such as a buffer memory, has a pixel position for each pixel position of device A, e.g., one pixel for each CCD sensor. Scanner device A may typically provide 1024 pixels, or some fraction or multiple thereof. This pixel capability must be selected on the basis of the resolution required to read dataforms of the complexity expected to be encountered. The required storage capacity of the buffer memory is thus determined by the number of scanner pixels and the number of lines of image data to be stored in order to scan and decode a single dataform.

FIG. 2 is a graphical representation of a buffer memory in simplified form. Once the pixel capacity of the scanner device is selected (horizontal row of pixel squares) the line capacity along the arrow coordinate must be determined (vertical columns of pixel squares). It will be apparent that if a large number of buffer memory rows of pixel storage are provided, there will be a high probability that all portions of a dataform will be scanned by an operator and there will be a corresponding high memory and processing cost. Conversely, for a small number of buffer memory rows of pixel storage memory cost and storage processing cost will be low, but portions of the dataform may not be scanned into memory by an operator. This is illustrated in FIGS. 3A and 3B. In FIG. 3A, if the operator triggers the scanner at T=0, which is ahead of dataform B in this example, a buffer memory large enough to store lines of image data for the entire image area D will be adequate to capture the entire dataform image. However, if in FIG. 3B a small buffer memory capable of storing image data only for area E is provided, the dataform image may be only partially captured before the buffer memory is full. Decoding would then be unsuccessful and the operator would have to repeat scanning in order to attempt to capture the complete dataform. Prior types of bar code readers may attempt to minimize this problem by incorporating a larger buffer memory. However, this solution is costly and results in increased power consumption. It also requires extended processing times for decoding, because image processing must be carried out for a larger buffer memory area.

Pursuant to the invention it is realized that, as conceptually indicated in FIG. 3C, a small buffer memory (adequate to provide storage for only image area E) can be successfully utilized. This will be possible if it can be arranged to store and retain lines of incoming image data of interest, in preference to lines of image data which do not contain dataform information and thus are not of interest.

Objects of the invention are, therefore, to provide new and improved dataform readers and methods able to utilize a linear array of photosensitive devices to read complex dataforms for successful decoding and, more particularly, dataform readers and methods providing one or more of the following capabilities:

operation with limited memory capacity, with interactive control of data retention based on concurrent analysis of incoming image data;

operation with first-in-first-out data retention, with interactive analysis to determine image data of interest;

operation with a memory capacity smaller than would be required to store an entire image of a dataform;

operation with image data storage retention based on identification of relevant dataform image data;

operation with image data storage retention based on identification of the type of dataform for which image data is stored; and operation based on location of a dataform image within image data, determination of an area of interest including the dataform image, and retention of image data for only a limited area including the area of interest.

SUMMARY OF THE INVENTION

In accordance with the invention, a dataform reader, using interactive storage and analysis of image data, includes a sensor to provide a succession of lines of image data, including lines representative of illumination reflected from a dataform. A memory is coupled to the sensor and has a capacity to store a number of lines of image data as such succession of lines is received from the sensor. The memory has a default FIFO mode in which the earliest stored line of image data is discarded when a line in excess of the aforementioned number of lines is coupled from the sensor.

The dataform reader also includes a locator coupled to the memory and operative concurrently with storage of the succession of lines of image data to provide recognition of a feature of the dataform in a reference lines of image data. The locator is responsive to successful feature recognition to identify a series of lines of image data to be used for decoding the dataform, such series of lines including at least one of: a line of image data preceding the reference line; and a line of image data subsequent to the reference line. A decoder coupled to the memory may be included to utilize lines of image data in such series of lines to decode the dataform.

More particularly, the dataform reader may be constructed so that:

the memory has (i) a capacity to store a number of lines of image data adequate to store a complete image of the dataform, (ii) a default FIFO mode in which the earliest stored line of image data is discarded when a line in excess of the number of lines of memory capacity is coupled from the sensor, and (iii) a retain mode selectable to retain a specified series of lines of image data; and the locator is further responsive to successful feature recognition to place the memory in a retain mode to retain (without discard) identified series of lines of image data for use in decoding the dataform.

Also in accordance with the invention, a method of reading a dataform, using interactive storage and analysis of image data, includes the steps of:

(a) providing successive lines of image data, including lines representative of illumination reflected from a dataform;

(b) storing successive lines of the image data in a memory having a capacity to store a number of lines of image data;

(c) concurrently with step (b), analyzing successive lines of the image data to provide recognition of a feature of the dataform upon storage of a reference line of image data; and (d) upon recognition of such feature, identifying a series of lines of image data to be used for decoding the dataform.

The method as described may include the additional steps of:

(e) retaining in memory each line of the series of lines of image data until such line is processed for decoding of the dataform; and (f) discarding from memory an earliest line of image data upon storage of a later line of image data in excess of the number of lines of storage capacity, provided the earliest line is one of: a line of image data not included in the series of lines; a line of image data which has already been processed for decoding of the dataform.

For a better understanding of the invention, together with other and further objects, reference is made to the accompanying drawings and the scope of the invention will be pointed out in the accompanying claims.

BRIEF DESCRIPTION OF THE DRAWINGS

FIGS. 3A, 3B and 3C are representations of relative sizes of buffer memory and dataform images.

DESCRIPTION OF THE INVENTION

Figure 2:
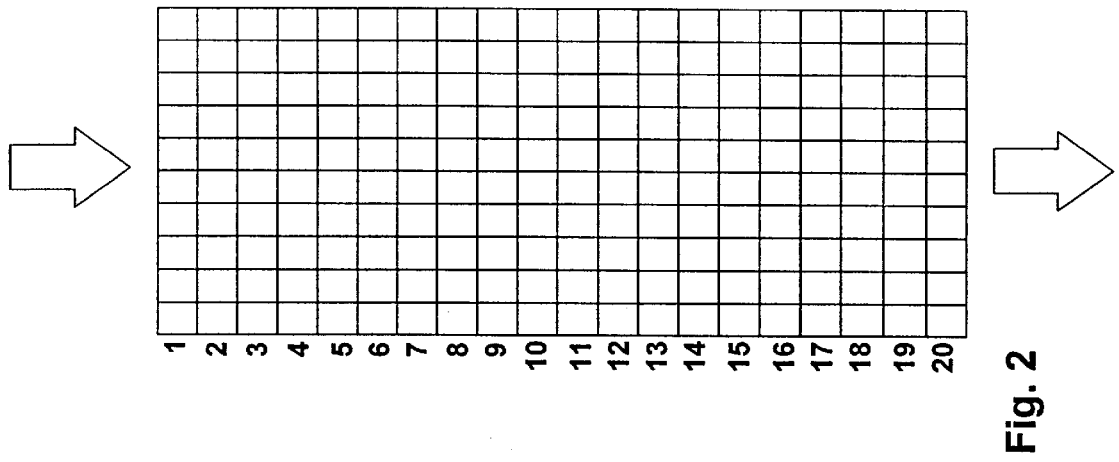
FIG. 2 is a graphical representation relating to storage of lines of image data in a buffer memory.
Figure 1:
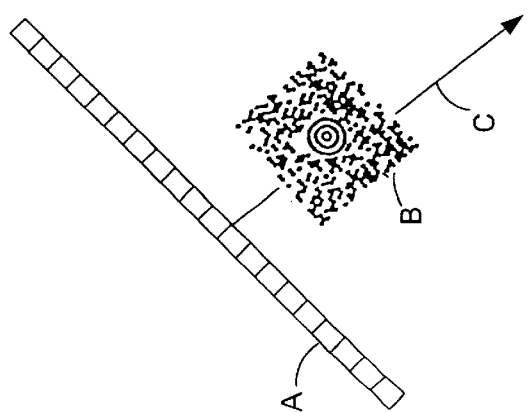
FIG. 1 is useful in describing movement of a linear scanner relative to a dataform.
Figure 4:
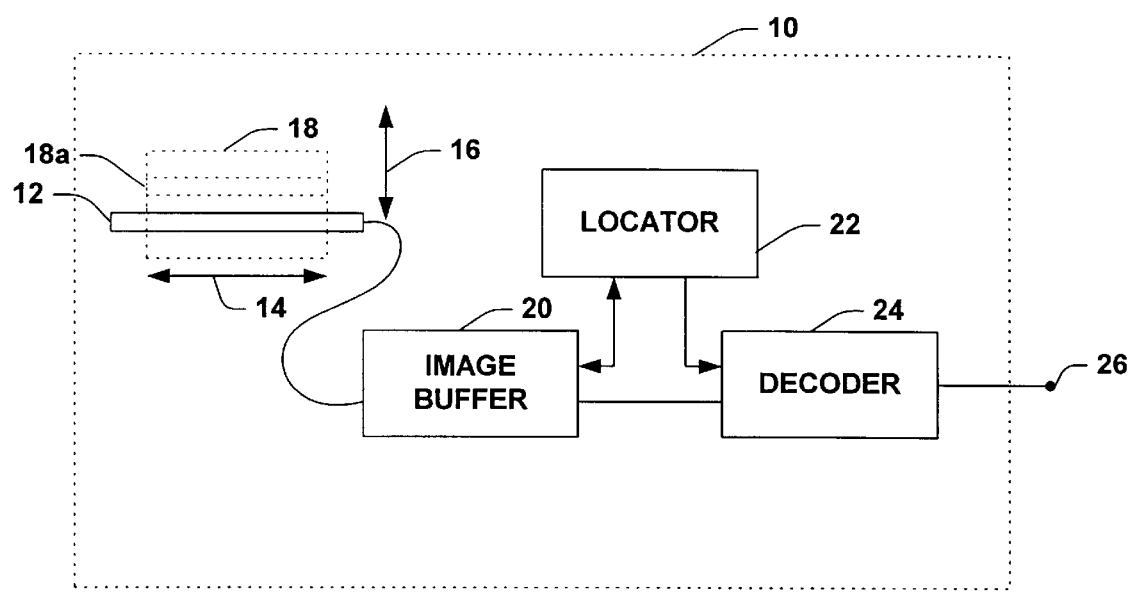
FIG. 4 is a simplified block diagram of a dataform reader utilizing the invention.

Referring now to FIG. 4, there is shown a simplified block diagram of a dataform reader 10 in accordance with the invention. As illustrated, reader 10 includes a sensor 12, which may comprise a linear array of photosensors spaced along a first direction 14. Operating in known manner, sensor 12 is arranged to provide successive lines of image data when moved in a direction, such as direction 16, transverse to direction 14 across an image 18. Image 18 may typically be a printed representation of a 2-D bar code or other dataform, with 18a representing one row of elements extending across a bar code, for example. For present purposes, direction 16 is transverse to direction 14 if it is normal to direction 14 or at any other angle which causes direction 16 to intersect direction 14. Aspects of operation and use of sensor arrays are further described in applicant's copending patent application Ser. No. 08/069,581, which is hereby incorporated herein by reference. That patent application also describes redundancy cancellation techniques which may be useful in reducing the volume of stored image data in some embodiments of the present invention.

Dataform reader 10 also includes a memory, shown as image buffer 20, coupled to sensor 12 and having a capacity to store a number of lines of image data. It will be apparent that the actual number of lines able to be stored will determine required memory capacity and thereby memory and processing costs. Successive lines of such image data can be provided and stored in known manner as sensor 12 is moved in direction 16. Memory 20 is arranged to include internal or external microprocessor or other suitable control arrangements capable of providing a first-in-first-out (FIFO) mode of operation in which as lines of image data are stored and storage capacity is reached and exceeded, the earliest line of image data is discarded when a line of image data in excess of the number of storable lines is coupled from sensor 12. This FIFO mode may typically be used as a default mode of memory operation and, as will be further described, a variety of modes of memory operation may be used in accordance with the invention. A common characteristic of such modes will typically be enablement of reading and decoding of dataforms while requiring only a limited memory storage capacity. A second such mode is a retain mode which is selectable to retain an identified or specified series of lines of image data in the image buffer 20, whether or not subsequent lines of image data are coupled to image buffer 20 from sensor 12. Such subsequent lines will not be stored in memory.

The dataform reader thus stores portions (e.g., lines) of image data in a portion-by-portion (e.g., line-by-line) basis in a process continuing over a period of time, and the stored image data may include image data representative of all or a portion of a dataform. The dataform reader as shown in FIG. 4 includes a locator 22 coupled to memory 20 and operative interactively on a concurrent basis while the image data is being stored. As will be further described, locator 22 is arranged to analyze image data for recognition of a dataform feature and provide interactive control of the storage of image data. For example, on recognition of a feature of a dataform in a reference line of image data, locator 22 may cause image buffer 20 to retain an identified series of lines of image data expected to include an image of the dataform. This and other modes of operation will be further described.

Figure 5:
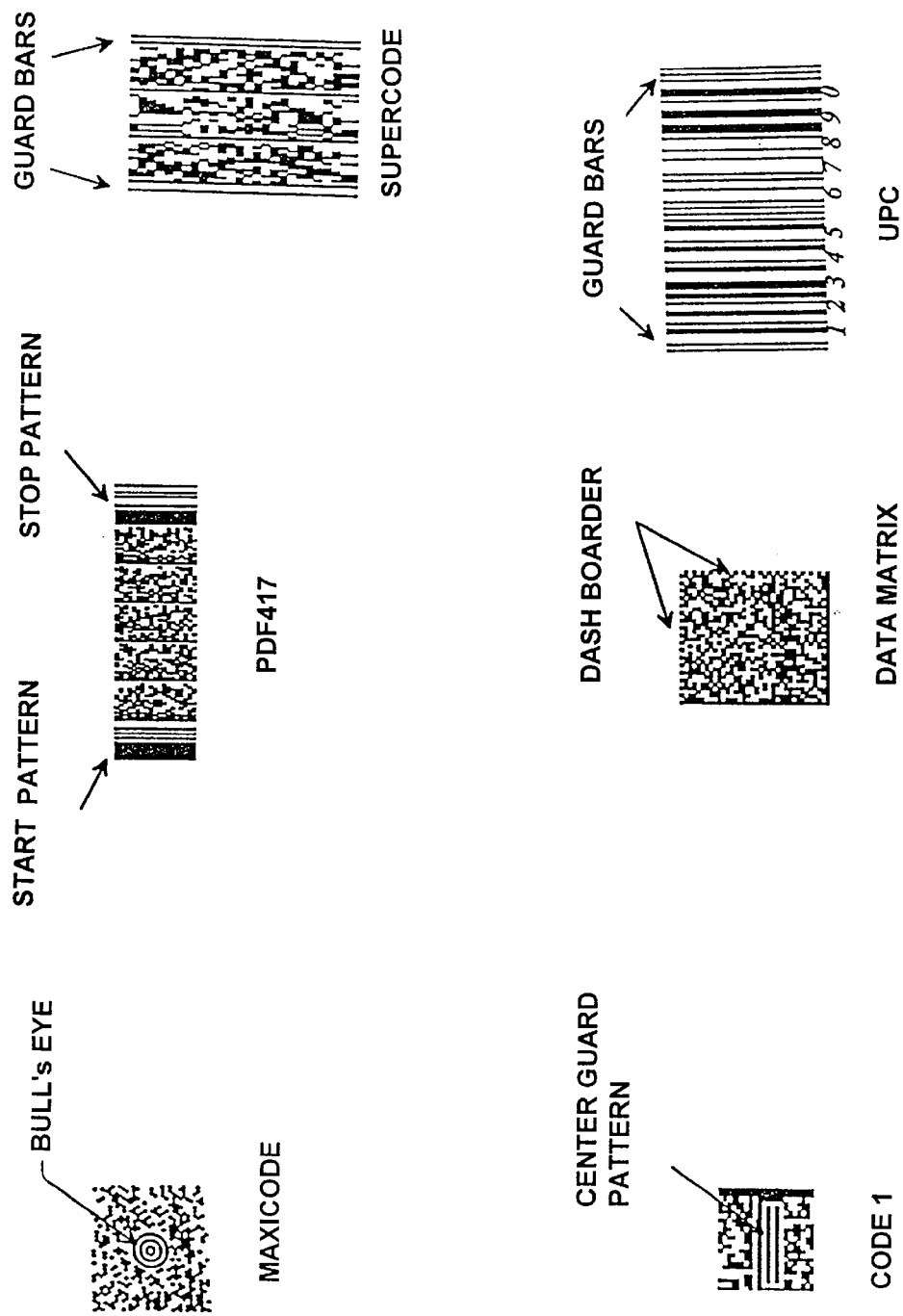
FIGS. 5, 5A and 5B show a variety of types of dataforms with indication of distinctive features.

Thus, on an interactive basis while lines of image data are being stored into memory, the retention in image buffer 20 of image data of interest (to the exclusion of image data not containing dataform information) is controlled by locator 22 based on recognition of a dataform feature. FIG. 5 includes representations of a variety of dataforms, each of which includes one or more features which enable recognition of the presence of the respective type of dataform in operation of locator 22. Such dataform features and arrangements for analyzing image data to provide dataform recognition are addressed in detail in commonly assigned copending application Ser. No. 08/443,909, filed May 17, 1995, which is hereby incorporated herein by reference.

Figure 5A:
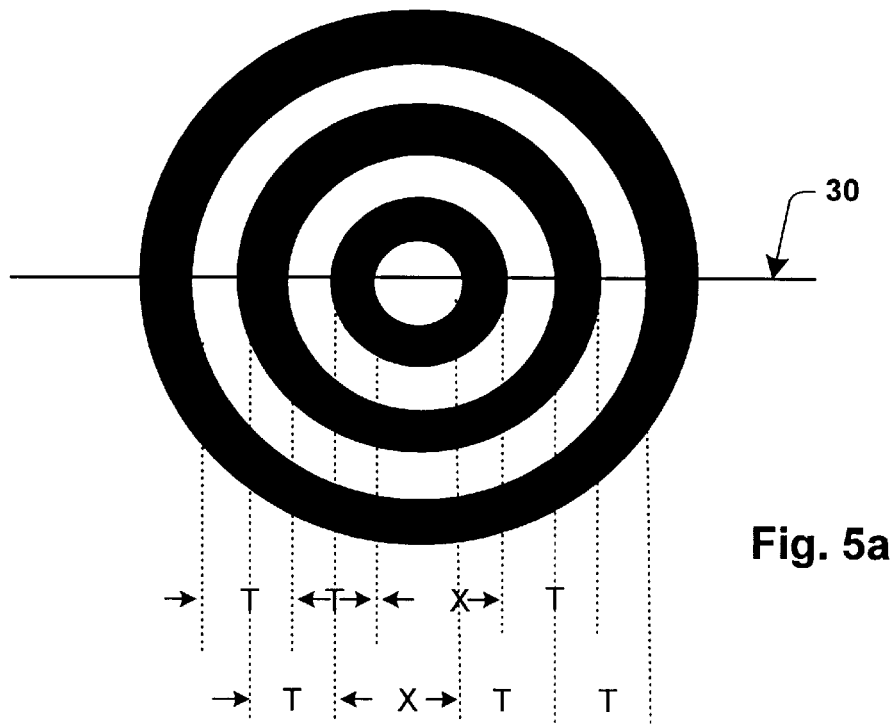

As described in that application, a scan line crossing a guard bar pattern included at the lateral edges of PDF417 or Supercode types of 2-D bar codes, or any of the types of 1-D bar codes, results in a line of image data including a black/white transition pattern. Each such transition pattern represents a recognition feature which is unique to the particular type of bar code. As further described, a line of image data produced by scanning along line 30 passing through the center of the bulls eye of a MaxiCode dataform as illustrated in FIG. 5A, results in a symmetrical T sequence having black/white transition spacings indicated at T, T, T, X, X, T, T, T, representing a feature of a MaxiCode dataform. By analyzing the line of image data crossing the center of the MaxiCode, recognition of this feature enables identification of the presence of a MaxiCode dataform. The T and X dimensions are indicative of the size of the entire dataform, so that from this line of image data a determination can be made as to the series of lines of image data which will encompass the complete dataform.

In addition, since this feature is characteristic of a line of image data passing through the center of a dataform, half of the relevant series of lines of image data will precede this reference line and half of the relevant series of lines will be subsequent to this reference line of image data. In view of this relationship of the reference line to the complete dataform, it will be appreciated that when, in the process of scanning the dataform, the scanner couples this reference line of image data to the memory, the first half of the series of lines including the MaxiCode image will already be stored in memory. Continued scanning and storage of lines of image data will thus be required in order to store the full series of lines which include the dataform image.

Figure 5B:
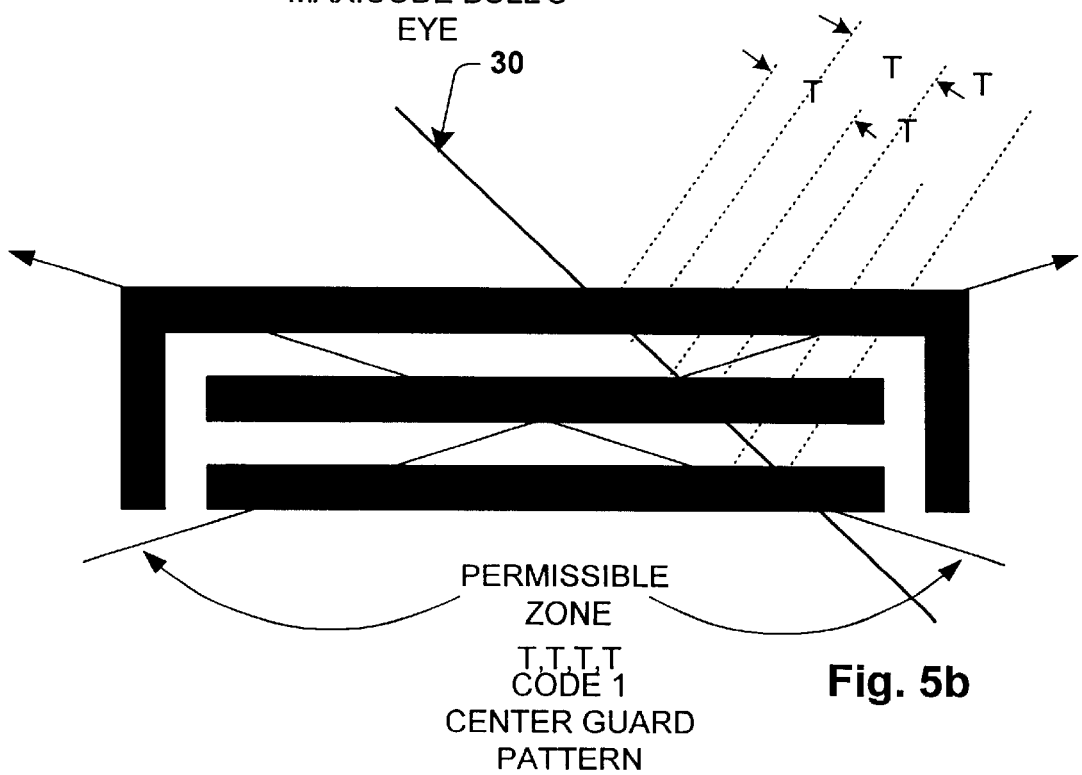

An important point here is that, in accordance with the invention, by interactively analyzing incoming lines of image data, once a dataform feature is recognized the series of lines of image data which will include the complete dataform image can be identified. This enables attention to be particularly directed to the image data of interest. Different treatment may thereby be accorded to image data which is not of interest, as will be further described. With the above description of MaxiCode feature recognition, it will be appreciated that corresponding feature recognition can correspondingly be carried out for other forms of matrix-type dataforms. For example, the dash border feature of the Data Matrix dataform and the center guard pattern of the Code 1 dataform, as illustrated in FIG. 5, can be recognized by analysis of lines of image data from scan lines passing through these features. As more particularly indicated in FIG. 5B, for example, a scan line 30 crossing the center guard pattern of a Code 1 dataform results in a line of image data which can be analyzed to provide recognition of the characteristic T sequence feature represented by T, T, T, T transition spacings. Recognition of features such as these enable dataform identification, as well as identification of a series of lines of image data which will encompass the complete dataform to enable decoding thereof. As noted, the relevant series of lines of image data may include lines preceding the reference line in which the feature is recognized (lines already in memory) and lines subsequent to the reference line (lines of image data to be provided by continued scanning and storage).

Locator 22 thus interactively analyzes image data as it is being stored in image buffer 20. On recognition of a feature of a dataform in a line of image data, locator 22 can control the retain mode of the image buffer to cause retention in memory of a specified series of lines of image data beginning with a particular line of image data. Depending on the type of dataform identified and particular mode of operation, the particular line selected may be the reference line in point, a line of image data coupled into memory a predetermined number of lines earlier than the reference line, or some other line of image data having a desired relationship to the reference line of image data.

Locator 22 may typically include a microprocessor with suitable units of software and programming to carry out dataform feature recognition as described in the referenced application Ser. No. 08/443,909 and as further described in commonly assigned copending application Ser. No. 08/456, 113, filed May 31, 1995, which is hereby incorporated herein by reference. The latter application has particular reference to MaxiCode dataforms. As will be apparent to skilled persons, locator 22 can be arranged to control or implement a variety of aspects of the operation of the dataform reader, including dataform feature recognition and control of the image data retention mode of image buffer 20 in order to retain image data of interest and discard or be non-responsive to image data not of interest. In some applications it may also be desirable to provide within locator 22 dataform location capabilities as described in applicant's U.S. Pat. No. 5,304,787, issued Apr. 19, 1994. This patent describes arrangements enabling identification of the bounds and orientation of a bar code within the image data for a scanned image in order to locate the corners of a nominally rectangular box encompassing a bar code. By location of a bounding box within lines of image data retained in memory, required processing of image data for dataform decoding may be reduced from processing of lines of image data of interest to portions of such lines of interest, as additional refinement if justified in particular applications.

As illustrated in FIG. 4, dataform reader 10 may additionally include a dataform decoder, shown as decoder 24. Decoder 24 is typically arranged to provide dataform decoding by use of image data from image buffer 20 and established decoding techniques suitable for the particular type of dataform which is to be decoded.

The FIG. 4 dataform reader includes an output port 26, which may be a terminal, cable connector, or other device suitable for use in coupling or transmitting decoded information for further use.

Operation

With respect to construction and operation of dataform readers, the present invention enables reduction in required memory capacity for storage of image data and reduction in image data processing. This can be accomplished in a line-by-line scanner by interactive analysis of incoming image data and control of the storage and retention of image data and non-retention or discarding of image data not of interest or no longer needed for dataform decoding.

As will be further described, one embodiment of the invention uses a first-in-first-out (FIFO) memory having capacity for storage of only a limited number of successive lines of image data. The FIFO operation may be provided as the default mode. Then, by control of retention of image data based on dataform location or other identification, the FIFO mode is overridden so that image data of interest is retained in memory in preference to the discarding thereof as further image data is provided by a line-by-line scanner. Thus, operation with a smaller memory capacity is enabled and processing of image data not of interest is reduced. As will be described, by further reduction of memory capacity and control of processing of image data, the invention enables use of a memory having a capacity smaller than that which would be required to store the entire image of a dataform to be decoded.

Figure 6:
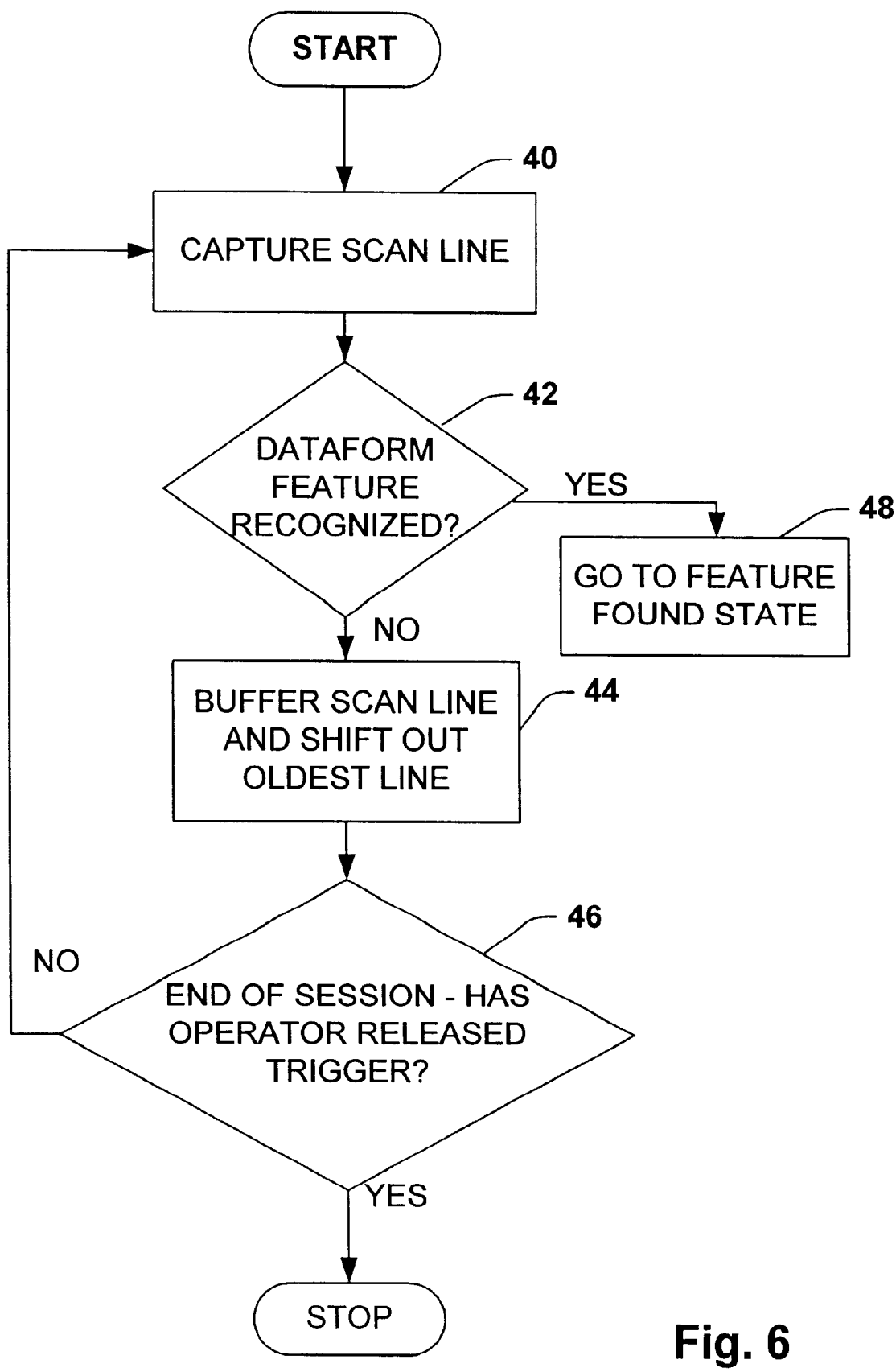
FIG. 6 is a flow chart illustrating operation in accordance with the invention prior to recognition of a dataform feature.

The dataform reader may be considered to have an operational flow between a first "Feature-Not-Found-Yet" state and a second "Feature Found" state. As described in applicants' copending applications referenced above, different forms of dataforms have different features which may be recognized by analysis so as to identify the type of dataform represented in stored image data. The first or Not Found state is illustrated by the flow chart of FIG. 6. As indicated, at step 40 a scan line of image data is read or captured by sensor 12 and stored in image buffer 20 of FIG. 4. At step 42 locator 22 accesses the scan line stored in memory and determines (by analysis based on recognition of particular features and predetermined relationships between such features and particular types of dataforms, as already discussed) whether a dataform feature is recognized in the image data of that scan line. More particularly, locator 22 can perform black/white pattern analysis and calculate a T-sequence for the line of image data. The T-sequence is compared to known T-sequences indicative of particular features of one or more different types of dataforms. Thus, the locator 22 effectively analyzes a line of image data for the presence of distinguishing features, such as:

(1) a start or stop pattern of a 1-D bar code or a 2-D bar code, such as a PDF417 or Supercode type of dataform; or (2) a characteristic image pattern of a 2-D matrix code, such as a MaxiCode, Code 1 or Data Matrix type of dataform.

Figure 7:
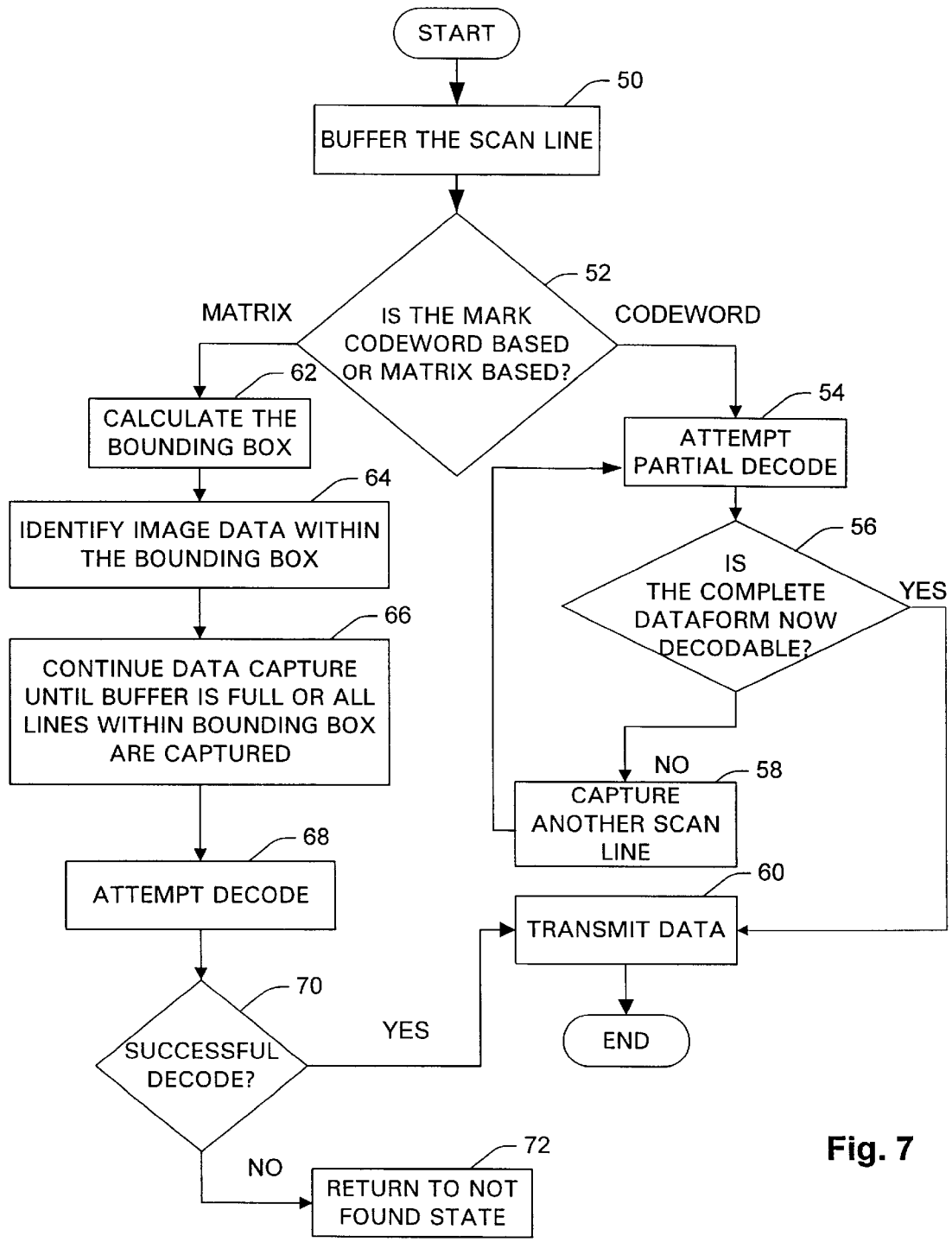
FIG. 7 is a flow chart illustrating operation in accordance with a first embodiment of the invention upon recognition of a dataform feature.

If no feature is recognized, at step 44 the line of image data is stored in buffer memory 20 and the oldest (i.e., earliest) scan line of image data is shifted out of memory (i.e., discarded) if memory 20 is full at that time. At step 46 the scanning continues by a return to step 40 for capture of another line of image data, if the operator keeps the dataform reader in an ON condition by trigger activation. Alternatively, the scanning activity stops if the trigger has been released. If, at step 42, a feature is recognized the reader transitions to the Feature Found state of operation at 48. FIG. 7 is a flow chart illustrating steps of the Feature Found state of operation.

In FIG. 7, at step 50 the line of image data in which a dataform feature has been recognized (the "reference line" of image data) is stored in buffer memory 20 of FIG. 4. At step 52 it is initially determined whether the dataform identified by the recognized feature is a code word type dataform (e.g., a 1-D or 2-D bar code dataform) or a matrix type dataform (e.g., a Maxicode or Code 1 dataform). The recognition of a dataform feature at step 42 of FIG. 6 enables this determination. For a code word type dataform, at step 54 the dataform reader attempts to decode any code words present in the stored line of image data, by decoding processing carried out using known techniques in decoder 24 of FIG. 4. At step 56 it is then determined (in decoder 24) whether sufficient code words have been decoded to enable the entire dataform to be decoded. It should be noted in this regard that with error correction and other data processing capabilities which are incorporated in dataforms such as 2-D bar codes, it may not be necessary to successfully decode every included code word in order to reassemble the entire data file as originally encoded in the dataform. If sufficient code words have not yet been decoded, at step 58 another line of image data is captured and processing returns to step 54 for further code word decoding. If, at step 56, sufficient code words have been decoded, at step 60, the decoded data is made available at output port 26 of FIG. 4 for further processing locally or elsewhere. At this point the reading and decoding of the dataform has been successfully completed and the reading session ends.

Alternatively, if at step 52 the dataform (based on the prior feature recognition) is determined to be a matrix type dataform, the reader proceeds to step 62. The dataform reader, at step 62, determines the outline of a bounding box or equivalent area of interest suitable to enclose a dataform, based on characteristics of the type of dataform identified by the recognized feature. Thus, with the objective of determining within which lines of image data an as-yet unknown dataform is represented, an area of interest or "bounding box" intended to be adequate to enclose the dataform is defined in terms of: identified corner locations; merely as a series of lines of image data representing an image area or as a start line and a stop line bounding such an image area; or in other suitable format. For example, the "bulls eye" of a MaxiCode may be the recognized feature. In such case, from information as to the size of the bulls eye, the size and position of a bounding box adequate to contain the entire MaxiCode dataform can be determined. As discussed above, because the bulls eye is positioned in the center of a MaxiCode, one half of the scan lines of image data which should be included in a bounding box will already be stored in memory in image buffer 20. Further, these lines of interest will be the latest or most recent lines stored in the buffer memory (running from the last stored or reference line through the immediately preceding lines until there is a sufficient series of lines of image data to contain an image of one-half of the MaxiCode). The lines of image data for the second half of the bounding box remain to be stored as coupled from scanner 12.

Utilizing the determination of bounding box size, at step 64 locator 22 identifies the relevant earlier series of lines of image data already stored in memory and causes the memory to retain such lines image data for dataform decoding (e.g., the reference line and successive earlier series of lines, as defined). Such earlier lines are thus retained as non-discardable during the current dataform decoding cycle (the "retained lines").

At step 66, the dataform reader continues collection and storage of image data as the operator continues to sweep the scanner across the dataform. New image data is thus stored in memory in image buffer 20 until the buffer memory is full, all lines within the bounding box have been stored, or scanning is terminated. During such continuing storage old lines of image data are discarded on a FIFO basis, provided however that the retained lines are retained and not discarded. When the memory is full, or scanning and storage is otherwise terminated, at step 68 the dataform reader attempts to decode the dataform. At step 70, if the dataform has been successfully decoded, the decoded data is coupled, via step 60, to output port 24 for further processing or remote transmission. At step 70, if decoding is not successful, operation returns, via step 72, to the Not Found state as described with reference to the flow chart of FIG. 6. Operation can then be continued until the dataform is successfully decoded, or terminated.

In view of the foregoing, a basic method of reading a dataform, using interactive storage and analysis of image data, includes the following steps:

(a) providing successive lines of image data, including lines representative of illumination reflected from a dataform (e.g., as coupled from sensor 12);

(b) storing successive lines of the image data in a memory having a capacity to store a number of lines of image data (e.g., image buffer 20);

(c) concurrently with step (b), analyzing successive lines of the image data to provide recognition of a feature of such dataform upon storage of a reference line of image data (e.g., by analysis in locator 22);

(d) upon recognition of such feature, identifying a series of lines of image data to be used for decoding the dataform (e.g., by action of decoder 22).

In operation of this method, in step (d) the series of lines may be identified by the bounds of a bounding box large enough to contain an image of the dataform, with the bounding box encompassing lines of image data preceding the reference line of image data and lines of image data subsequent to such reference line. The method may further include the additional steps of:

(e) retaining in memory each line of the series of lines of image data until such line is processed for decoding of the dataform; and (f) discarding from memory an earliest line of image data upon storage of a later line of image data in excess of the number of lines of storage capacity, provided the earliest line is one of: a line of image data not included in the series of lines; a line of image data which has already been processed for decoding of the dataform.

In operation as described above, the memory capacity of image buffer 20 must be large enough so that all scan lines including necessary dataform image data (i.e., all lines within the bounding box) are stored and retained in memory for use in dataform decoding. Thus, the memory must be at least as large as the bounding box. However, by interactively controlling image data storage and discard, the invention enables the required memory capacity to be limited to a size equal to or moderately exceeding the effective size of the dataform to be decoded. By comparison, prior line-by-line readers have typically required significantly larger memory capacity in order to enable storage of a complete dataform image in the presence of positioning inaccuracies inherent during scanner use by an operator.

Greater reduction of required memory capacity is provided by a second embodiment of the invention. More specifically, dataform decoding operation is enabled with memory capacity smaller than that required to store the lines of image data falling within a bounding box as described above (i.e., a memory capacity too small to store the entire dataform image). Required memory capacity will fall between the capacity necessary to store all lines of the bounding box and the capacity necessary to store all lines of the bounding box which precede the reference line in which the dataform feature is recognized. The latter capacity will typically not exceed one-half of the lines of the bounding box (as for the MaxiCode example, as discussed above).

Figure 8:
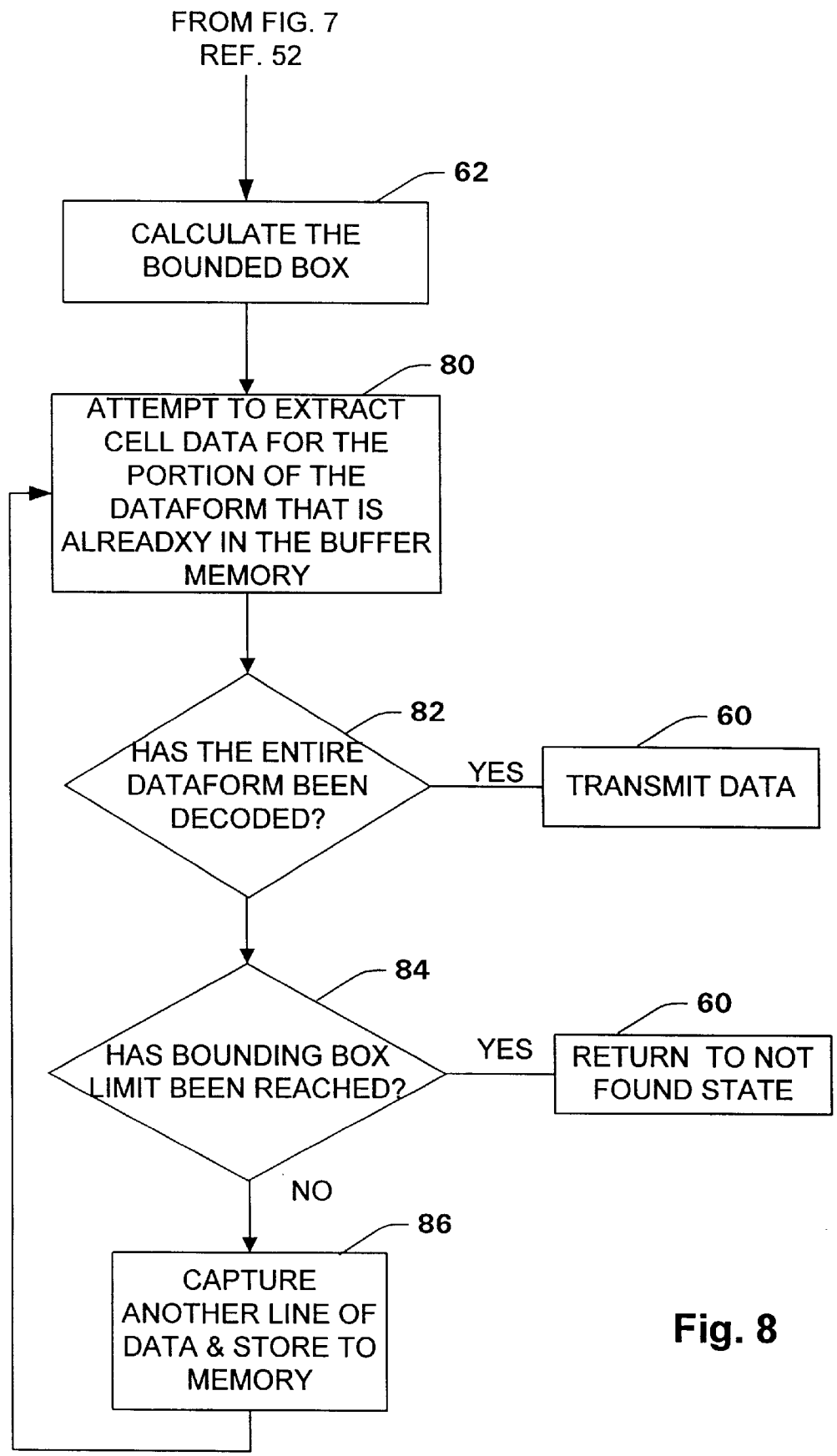
FIG. 8 is a flow chart illustrating operation in accordance with a second embodiment of the invention upon recognition of a dataform feature.

With reference to FIG. 8, there is illustrated a flow chart of a method of operation pursuant to the second embodiment, which uses an image buffer having a memory capacity too small to store the total lines of image data required to store a complete dataform image. At step 62 a bounding box is determined as in the corresponding step of FIG. 7.

At step 80, an attempt is made to extract cell data from the lines of image data already stored in buffer memory at the time of recognition of the distinguishing feature of a dataform. At step 82, it is determined whether the entire dataform has then been decoded. Initially, the entire dataform will not have been decoded. In the absence of complete decoding, at step 84 it is determined whether the limit of the bounding box has been reached (e.g., the last line of image data as encompassed by the defined bounding box has been processed). If the last line has been processed without successful decoding of the dataform, at step 72, operation returns to the Not Found state as described with reference to FIG. 6. Alternatively, if at step 82 sufficient data has been provided to enable decoding of the entire dataform, at step 60 the decoded data is provided to an output port or otherwise further processed.

If, at step 84, there remain further lines of image data encompassed by the bounding box, at step 86 another line of image data is stored in memory and operation returns to step 80 for further processing. An important point here is that, at step 86, if the memory is then at full capacity, the earliest line of image data is discarded (FIFO operation). This is done even if the earliest line represents actual dataform image data. Thus, with a memory capacity capable of storing only about 60 percent of a MaxiCode image, for example, cell data extraction is started when a characteristic MaxiCode feature is recognized. At this point, about one-half of the image data for the MaxiCode is already stored in memory and available to be decoded. Then, as additional lines of image data are stored for the remaining half of the MaxiCode, the earliest lines of data will begin to be successively discarded on a FIFO basis. As the additional lines of image data are stored and decoded, decoding of the MaxiCode is completed. With this operation, the MaxiCode can be completely decoded while having an available memory storage capacity large enough to store image data for only 60 percent of the full MaxiCode image. If decoding is successful, the decoded data is provided for further processing. If decoding is not successful, the reading and decoding cycle can be repeated. Advantages include lower costs of procurement and operation of a smaller memory, as well as resulting operational power savings for extended battery operation. In practice, the minimum memory capacity for successful operation in a particular application can be determined in view of actual results achieved on a trial basis or otherwise computed or estimated. In view of known prior art, the present invention makes practical the first dataform readers capable of operation with less buffer memory than the minimum required to buffer the entire image of a dataform to be decoded.

A method in accordance with the second embodiment of the invention may thus include the following steps:

(a) providing successive lines of image data, including lines representative of illumination reflected from a dataform (e.g., as coupled from scanner 12);

(b) storing successive lines of image data in a memory having a capacity to store a number of lines of image data adequate to store only a partial image of the dataform (e.g., an image buffer 20 may have a capacity to store only about 60 percent of a MaxiCode dataform);

(c) concurrently with step (b), analyzing successive lines of the image data to provide recognition of a feature of the dataform in a reference line of the image data (e.g., a line of image data crossing the center of the bulls eye of a MaxiCode dataform);

(d) upon successful step (c) recognition of the feature, (i) identifying a series of lines of image data to be used for decoding of said dataform (e.g., a series of lines half before and half after the reference line) and (ii) initiating decoding of the dataform beginning with the earliest lines of the identified series of lines (e.g., at the leading edge of the MaxiCode); and (e) discarding the earliest stored line of image data upon storage of a later line of image data in excess of the number of lines of storage capacity, regardless of whether such earliest stored line is within the identified series of lines. Thus, in step (e) lines of image data containing MaxiCode image values will be discarded from memory even before later lines of image data containing further MaxiCode image values are even scanned for storage in memory. This enables operation with a small memory having a storage capacity inadequate to store the entire MaxiCode image in this example.

Based on the foregoing methods of operation, as described, in accordance with the invention an alternative method of operation utilizing general recognition of the presence of image data including dataform image values can be readily employed. Thus, for example, if in a particular application it is known that only one type (or one of a number of specific types) of dataform is to be decoded, it may not be necessary to implement dataform feature recognition. Instead, it may suffice to merely recognize on an interactive basis, the presence in incoming lines of image data which include dataform information. For this and related types of applications, in accordance with the invention a method of reading a dataform, using interactive storage and analysis of image data, may include the following steps:

(a) providing successive lines of image data, including lines representative of illumination reflected from a dataform;

(b) storing successive lines of such image data in a memory having a capacity to store a number of lines of image data;

(c) concurrently with step (b) analyzing successive lines of the image data to provide recognition of image data representative of the dataform;

(d) upon recognition of image data representative of the dataform, retaining representative image data in memory for purposes of decoding the dataform; and (e) discarding a line of image data not retained pursuant to step (d) upon storage of a later line of image data in excess of the number of lines of storage capacity.

While there have been described the currently preferred embodiments of the invention, those skilled in the art will recognize that other and further modifications may be made without departing from the invention and it is intended to claim all modifications and variations as fall within the scope of the invention.

What is claimed is:

1. In a dataform reader, an interactive storage and analysis method, comprising the steps of:

(a) providing a memory operable in two modes which when full to capacity stores a number of lines of image data, said memory controllable to use retain and discard modes to either (i) in said retain mode, retain the stored lines of image data after the memory is full and not store a subsequent line when provided, or (ii) in said discard mode, discard an earliest stored line of image data and store a subsequent line when provided after the memory is full;

(b) providing to said memory successive lines of image data, including lines representative of illumination reflected from a dataform;

(c) concurrently with step (b), analyzing successive lines of said image data to provide recognition of a feature of said dataform and identification of a reference line of said image data associated with such recognition, said feature usable to identify the type of dataform; and (d) controlling the mode of said memory (i) upon recognition of said feature, to utilize said retain mode to retain in memory a series of lines of image data to be used for decoding said dataform, and (ii) in the absence of recognition of said feature, to utilize said discard mode to discard an earliest stored line of image data and store a subsequent line when provided.

2. A method as in claim 1, wherein in step (d) said series of lines includes lines of image data preceding said reference line and lines of image data subsequent to said reference line.

3. A method as in claim 1, wherein in step (d) said series of lines is identified by the bounds of a bounding box large enough to contain an image of said dataform, said bounding box encompassing lines of image data preceding said reference line and lines of image data subsequent to said reference line.

4. A method as in claim 1, including the additional steps of:

(e) retaining in memory each line of said series of lines of image data until said line is processed for decoding of said dataform; and (f) discarding from memory an earliest line of image data upon storage of a later line of image data in excess of said number of lines of storage capacity, provided said earliest line is one of: a line of image data not included in said series of lines; a line of image data which has already been processed for decoding of said dataform.

5. A method as in claim 4, wherein said number of lines of storage capacity of said memory is a number of lines adequate to store image data representative of more than one-half and less than all of the information content of a complete dataform.

6. A method as in claim 1, wherein existing step (d) is replaced by the following steps (d) and (e):

(d) in the absence of successful step (c) recognition of said feature, controlling the mode of said memory to utilize said discard mode to discard an earliest stored line of said image data upon storage of a later line of image data in excess of said number of lines of storage capacity; and (e) upon successful step (c) recognition of said feature, (i) identifying a series of lines of image data to be used for decoding of said dataform and (ii) controlling the mode of said memory to utilize said retain mode to retain said identified series of lines in memory for decoding purposes, said series of lines including at least one of a line preceding said reference line and a line subsequent to said reference line.

7. A method as in claim 6, including the additional step of:
(f) utilizing image data in said series of lines of image data to decode said dataform.

8. In a dataform reader, an interactive storage and analysis method, comprising the steps of:
(a) providing a memory operable in two modes which when full to capacity stores a number of lines of image data, said memory controllable to use retain and discard modes to either (i) in said retain mode, retain the stored lines of image data after the memory is full and not store a subsequent line when provided, or (ii) in said discard mode, discard an earliest stored line of image data and store a subsequent line when provided after the memory is full;
(b) providing to said memory successive lines of image data, including lines representative of illumination reflected from a dataform;
(c) concurrently with step (b) analyzing successive lines of said image data to provide recognition of image data representative of said dataform; and
(d) controlling the mode of said memory (i) upon recognition of image data representative of said dataform, to utilize said retain mode to retain said representative image data in memory for purposes of decoding said dataform and (ii) in the absence of recognition of representative image data, to utilize said discard mode to discard an earliest stored line of image data and store a subsequent line when provided.

9. A method as in claim 8, including between steps (c) and (d) an additional step as follows:
(x) determining bounds of a bounding box large enough to contain a selected portion of an image of said dataform.

10. A method as in claim 9, wherein in step (x) said selected portion is less than the entire dataform, but includes image data representative of at least one-half of the information content of said dataform.

11. A method of reading a dataform using a memory too small to store image data for a complete dataform image, by dataform feature recognition with interactive storage and analysis of image data, comprising the steps of:
(a) providing successive lines of image data, including lines representative of illumination reflected from a dataform;
(b) storing successive lines of said image data in a memory having a capacity inadequate to store image data representative of all of the information content of said dataform;
(c) concurrently with step (b) and prior to decoding of said dataform, analyzing successive lines of said image data to provide identification of the type of dataform by recognition of a feature of said dataform and identify a reference line of image data associated with said recognition;
(d) upon successful step (c) recognition of said feature and identification of the type of dataform present, (i) identifying a series of lines of image data to be used for decoding of said dataform including lines already stored and lines not yet stored and (ii) initiating decoding of said dataform beginning with the earliest line of said identified series of lines; and
(e) discarding an earliest stored line of said image data upon storage of a later line of image data in excess of said number of lines of storage capacity, to enable use of a memory too small to store a complete image of said dataform.

12. A dataform reader, using interactive storage and analysis of image data, comprising:
a sensor to provide a succession of lines of image data, including lines representative of illumination reflected from a dataform;
a two mode memory coupled to said sensor and having a capacity to store a number of lines of said image data as said succession of lines is received from said sensor, said memory having two operating modes (i) a retain mode selectable to retain a series of lines of image data, and (ii) a default FIFO mode in which an earliest stored line of said image data is discarded when a line in excess of said number of lines is coupled from said sensor; and
a locator coupled to said memory and operative concurrently with storage of said succession of lines of image data to provide recognition of a feature of said dataform and identification of a reference line of image data associated with such recognition, said locator responsive to successful feature recognition to (i) identify a series of lines of image data to be used for decoding said dataform, and (ii) control said memory to operate in said retain mode to retain said series of lines of image data;
said locator arranged to permit said memory to operate in said default FIFO mode when feature recognition has not been successfully achieved.

13. A dataform reader as in claim 12 additionally comprising:
a decoder coupled to said memory to utilize lines of image data in said series of lines to decode said dataform.

14. A dataform reader as in claim 12, wherein said series of lines includes both lines of image data preceding said reference line and lines of image data subsequent to said reference line.

15. An interactive storage and analysis method for a dataform reader, comprising the steps of:
providing successive lines of image data to a memory, wherein the lines of said image data include data representative of illumination reflected from a dataform;
analyzing successive lines of the image data provided to said memory, to recognize a feature of said dataform, and using said feature to identify the type of dataform from among a plurality of different 1-D and 2-D bar code dataform types decodable by the dataform reader:
discarding an earliest stored line of the image data stored in said memory and storing a subsequent line of the image data when provided after the memory is full, until the type of dataform from among the plurality of different 1-D and 2-D bar code dataforms is identified, and thereafter retaining lines of said image data stored in said memory after the memory is full and storing no subsequent lines of the image data when provided.

16. A method according to claim 15, wherein said method further comprises decoding said dataform from said lines of image data retained in said memory.

17. A system for data storage and analysis method for a dataform reader, comprising:
memory means selectively operable in at least two storage operating modes, said first storage operating mode discarding data previously stored therein to provide memory storage space to store subsequently received data, and said second storage operating mode retaining data previously stored therein and storing no subsequent received data;

transmission means for transmitting data to the memory means, wherein the data includes image data representative if the reflectivity of one or more portions of a dataform;

analysis means for analyzing data transmitted to the memory means, to recognize a feature of said dataform, wherein said feature is used to identify the type of dataform from among a plurality of different 1-D and 2-D bar code dataform types decodable by the dataform reader; and means modifying the storage operating mode of said memory means depending upon whether the type of dataform from among the plurality of different 1-D and 2-D bar code dataforms types is identified, wherein the said memory means is operated in said first storage operating mode until a dataform type has been identified, and thereafter operating said memory means in said second storage operating mode.

18. An apparatus according to claim 17, wherein said apparatus further comprises decoding means for decoding said dataform from said data retained in said memory means during said second storage operating mode.

* * * * *